Aug. 13, 1968    J. FERRIS    3,396,934
VINYL MOLD MAKING APPARATUS
Filed June 10, 1966    2 Sheets-Sheet 1
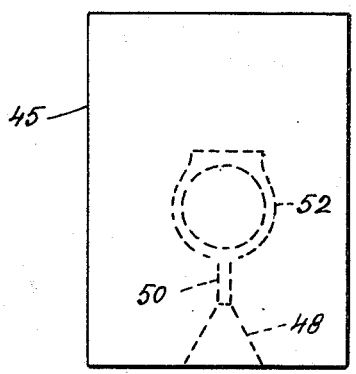
Fig-1.
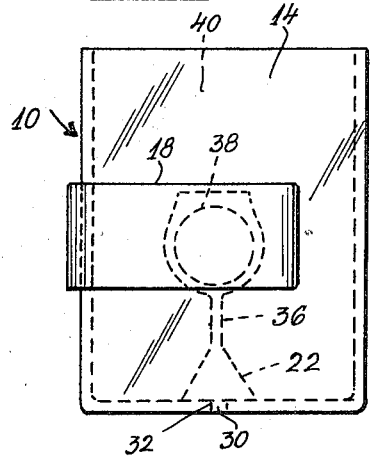
Fig-2.
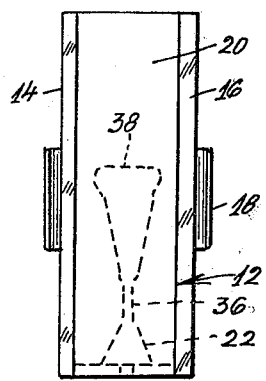
Fig-3.
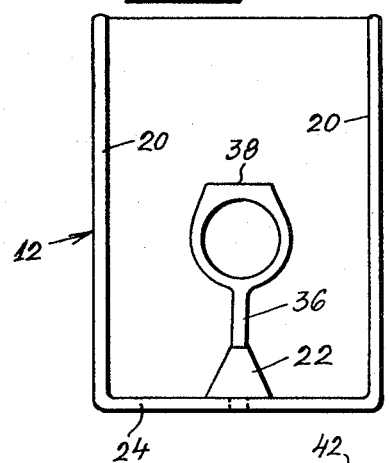
Fig-4.
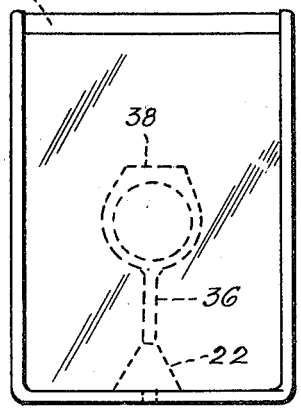
Fig-5.
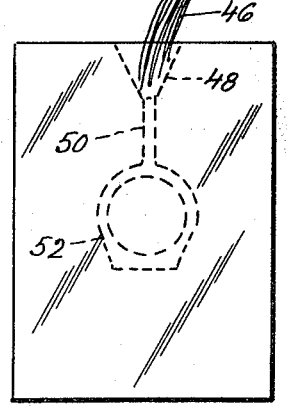
Fig-8.
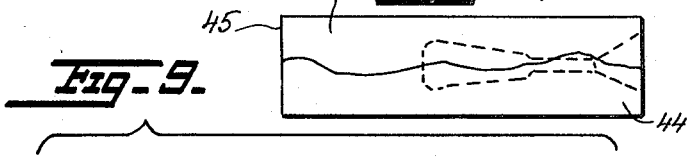
Fig-7.
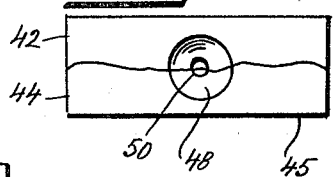
Fig-6.
Fig-9.
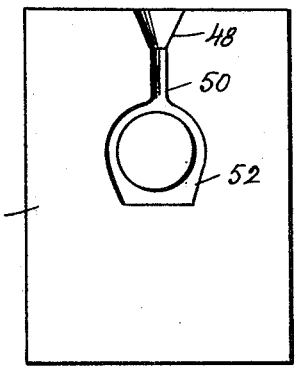
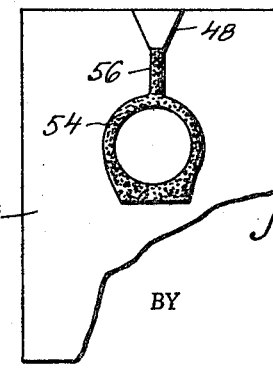
INVENTOR
Jack Ferris
BY Polachek & Saulsbury
ATTORNEYS Aug. 13, 1968 J. FERRIS 3,396,934
VINYL MOLD MAKING APPARATUS
Filed June 10, 1966 2 Sheets-Sheet 2

INVENTOR
Jack Ferris
BY Polachek & Saulsbury
ATTORNEYS

United States Patent Office 3,396,934
Patented Aug. 13, 1968

3,396,934
VINYL MOLD MAKING APPARATUS
Jack Ferris, c/o Jewelry Aids Co., 130—140 227th St.,
Laurelton, N.Y. 11413
Filed June 10, 1966, Ser. No. 556,689
7 Claims. (Cl. 249—163)

I have discovered that if transparent vinyl plastic compound is used in making the mold, the mold maker can see the pattern or model clearly as he cuts the mold to withdraw the pattern or model. This reduces the skill requirements, speeds the cutting process and greatly reduces spoilage or failure. Furthermore, the operator can view the progress of the movement of the molten wax as it is being injected into the mold. Thus corrective measures may suggest themselves when mold cavities fail to fill properly. I have also discovered that the vinyl compound is self-lubricating so that no powder, oil or other release compound or agent is ever needed and consequently there is no danger of poor surface finish in the wax patterns and the time consumed in applying such release compounds and agents is thus saved.

Furthermore, this vinyl compound can be supplied in a variety of formulations with end products of any degree of hardness ranging from a very soft stretch rubber to an almost rigid material comparable to hard rubber. Accordingly high pressure injection requirements can be met with a harder mold material. Another advantage of this vinyl mold compound is that there is no cavity shrinkage.

A principal object of the present invention is to provide apparatus for forming a mold made of vinyl plastic compound.

Another object of the invention is to provide a mold made of vinyl plastic compound.

Still another object of the invention is to provide mold apparatus for properly positioning and holding the model or pattern and for supporting the mold compound during the processing of the mold.

Yet another object of the invention is to provide a sectional mold of material that needs no release compound or agent to facilitate separation of the sections thereof.

Another object is to provide a mold of transparent plastic material so that the pattern or model is visible and thus the chance of a miscut is reduced to a minimum.

Yet another object is to provide molding apparatus with glass surfaces and plastic molding material so that the high luster quality of the glass is imparted to the surface of the molding material thus preserving the clarity and transparency of the molding material.

For further comprehension of the invention and of the objects and advantages thereof, reference will be had to the following description and accompanying drawings and to the appended claims in which the various novel features of the invention are more particularly set forth.

In the accompanying drawings forming a material part of this disclosure:

FIGURE 1 is a front elevational view of a mold made in accordance with the present invention.

FIG. 2 is a side elevational view of improved apparatus used in making the mold of FIG. 1.

FIG. 3 is an edge view looking from the right of FIG. 2.

FIG. 4 is a side elevational view of the U-shaped frame and pattern or model of FIG. 2.

FIG. 5 is a view similar to FIG. 4 showing the molding material set around the pattern or model.

FIG. 6 is an end view of the mold after being cut into sections.

FIG. 7 is a side view thereof.

FIG. 8 is a front elevational view of the mold shown turned upside down and wax being poured into the sprue cavity.

FIG. 9 is an elevational view showing the inner surfaces of the mold sections, the cavity in the left hand section being empty and the cavity in the right hand section being filled with wax, part of the right hand section being shown broken away.

Figure 10:
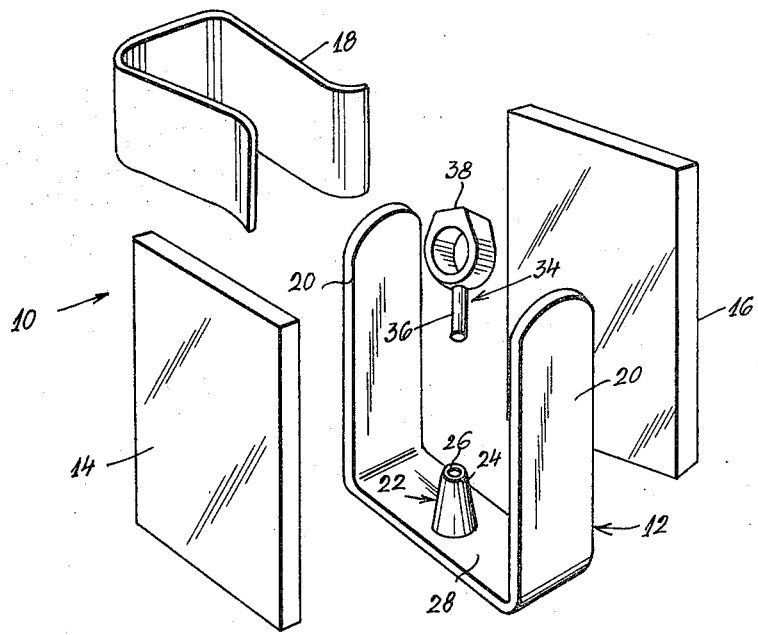
FIG. 10 is a spread perspective view of the apparatus shown in FIG. 2.

Referring now in detail to the various views of the drawings, in FIGS. 2 and 10 improved apparatus for preparing a mold for making wax duplicates of metal patterns or models is shown and designated generally at 10. The apparatus consists of a U-shaped metal frame 12, a pair of glass plates 14 and 16 held removably in place against the side edges of the frame 12 by means of a U-shaped spring metal clip 18 slipped over one of the legs 20 of the frame and over the adjacent portions of the long edges of the glass plates.

A sprue member 22 with a tapered body 24 and a socket opening 26 in the top thereof is removably mounted on the bight portion 28 of the frame by means of a pin 30 depending from the surface of the base thereof and seated in a hole 32 formed in the center of the bight portion of the frame. A pattern or model assembly 34 is removably supported on the sprue member 22. This assembly consists of a gate forming round rod 36 inserted into the socket opening 26 in the sprue member. A pattern or model of the device to be duplicated is suitably fixed on the top of the gate rod 36. This pattern or model is herein shown for purposes of illustration only as a metal ring 38.

The frame 12 and side plates 14 and 16 form a hollow cavity 40 in which the sprue member 26, gate rod 34 and pattern or model ring 38 extend as a unit upwardly centrally thereof. The top of the cavity is open. A solution of transparent vinyl plastic comypound is poured into the cavity 40 between the glass side plates and metal U-shaped frame, the U-shaped clip 18 holding the frame and glass plates firmly and against displacement. The liquid solution of vinyl may be poured into the cavity by hand, or if desired may be included in an automated system. After the cavity has been filled with the plastic solution, the apparatus is usually placed in a tray and placed under high vacuum in order to remove air in the plastic molding material. Next the apparatus is placed in an oven and the plastic material baked at any controlled temperature, for instance 350° F., for as long as it takes for a given size mold to reach 350° F. This is usually from 15 minutes to 1 hour. During the curing or baking process there is no pressure required and therefore no need for a vulcanizer.

After the plastic material has been baked and becomes set, the frame 12 and glass plates 14 and 16 are removed and the set plastic mold is manually cut along its longitudinal center, by a suitable tool, in a wavy line as best seen in FIG. 7 in order to divide the mold in line with the model, into sections 44 and 42, and in order to remove the model, gate rod and sprue member, the mold sections 44 and 42 are then replaced to intimate juxtaposition to reform the mold openings, the wavy edges and the indulations in the cut surfaces of the sections facilitating such juxtaposition. The finished transparent mold 45 such as shown in FIG. 1 is now ready for pouring of the wax as shown in FIG. 8 wherein the mold is shown turned upside down and an opaque wax solution 46 is shown being poured into the sprue opening 48 of the finished mold from which opening it will fall by gravity through the gate 50 into the ring opening 52 for making an opaque wax ring 54, a duplicate of the metal ring model 38, as shown in FIG. 4. The mold sections are then separated and the wax ring 54 with gate 56 attached is removed from the section 44, while illustration has been made in FIG. 8 of the pouring of wax solution into the sprue opening, it is preferable and more often that a pressure injection procedure is employed.

Figure 11:
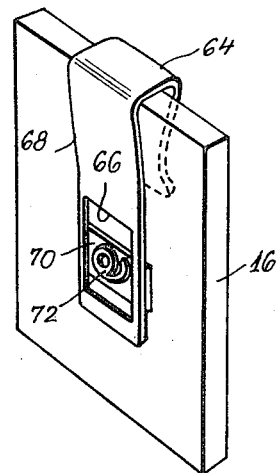
FIG. 11 is a perspective view of a die device used for identification purposes mounted on a portion of the apparatus.
Figure 12:
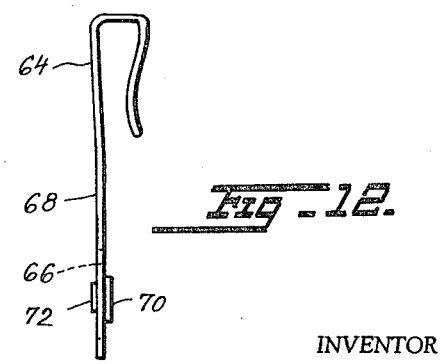
FIG. 12 is an edge view of the die device.

The invention contemplates providing means for identifying the mold or model being duplicated and for this purpose FIGS. 11 and 12 show a die member including a U-shaped bracket 64 adapted to be hung over the top edge of one of the glass plates 14 or 16 on the inner surface thereof. The bracket has an opening 66 in one leg 68 thereof for removably supporting a plate 70 with indicia 72 on the face thereof which indicia identifies the mold or model or the like. The plate 70 will be positioned in the cavity wherein the plastic molding material is poured.

It shall be understood that while this description has been made with reference to the use of vinyl compound, that other plastic-like materials having similar properties may also be used.

While I have illustrated and described the preferred embodiments of my invention, it is to be understood that I do not limit myself to the precise construction herein disclosed and that various changes and modifications may be made within the scope of the invention as defined in the appended claims.

What is claimed is:

1. Apparatus for making molds including a metal U-shaped frame, plates closing the sides of the frame, means for holding the plates against the side edges of the frame, a sprue member mounted on the top surface of the bight portion of the frame, centrally thereof, said sprue member having a central socket at the top thereof, a gate-forming round rod fitted in said central socket and upstanding therefrom and a metal model to be duplicated supported on the top of said gate forming rod, said frame and plates defining a cavity having an open top for receiving plastic molding material.

2. Apparatus for making molds as defined in claim 1 wherein the means for holding the plates against the side edges of the frame comprises a U-shaped spring metal clip.

3. Apparatus for making molds as defined in claim 1 wherein the U-shaped frame and the sprue member are formed as a unit.

4. Apparatus for making molds as defined in claim 1 wherein the plates are formed of glass.

5. Apparatus for making molds as defined in claim 1 wherein the means for holding the plates against the side edges of the frame comprises a U-shaped metal clip and the U-shaped frame and the sprue member are formed as a unit.

6. Apparatus for making molds as defined in claim 1 wherein the means for holding the plates against the side edges of the frame comprises a U-shaped spring metal clip and the U-shaped frame and the sprue member are formed as a unit, and the plates are formed of glass.

7. Apparatus for making molds as defined in claim 1 characterized by a removable die member removably supported on the top of one of the closure plates, said die member having indicia identifying the mold being formed.

References Cited
UNITED STATES PATENTS

| | | | |
|---|---|---|---|
| 839,987 | 1/1907 | Butters | 249—117 X |
| 2,274,186 | 2/1942 | Brace | 249—54 X |
| 2,337,036 | 12/1943 | Erdle | 249—134 X |
| 2,747,230 | 5/1956 | Magnus | 18—42 |
| 3,056,166 | 10/1962 | Weinberg | 18—42 |
| 3,120,029 | 2/1964 | Gingrande et al. | 249—134 X |
| 3,309,738 | 3/1967 | Friedman | 18—42 |

J. SPENCER OVERHOLSER, *Primary Examiner.*

J. S. BROWN, *Assistant Examiner.*